United States Patent
Siy et al.

(10) Patent No.: US 8,433,455 B2
(45) Date of Patent: Apr. 30, 2013

(54) ELECTRICAL VEHICLE RANGE PREDICTION

(75) Inventors: Teddy Siy, Royal Oak, MI (US); Matthew A. Herrmann, Royal Oak, MI (US); Todd P. Lindemann, Howell, MI (US); Jason P. Hafer, Gaines, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 13/205,393

(22) Filed: Aug. 8, 2011

(65) Prior Publication Data

US 2012/0109408 A1    May 3, 2012

Related U.S. Application Data

(60) Provisional application No. 61/408,468, filed on Oct. 29, 2010.

(51) Int. Cl.
*G05D 1/00* (2006.01)
*G06F 7/00* (2006.01)

(52) U.S. Cl.
USPC .......... 701/1; 701/22; 701/29.6; 701/53; 701/56

(58) Field of Classification Search .......... None
See application file for complete search history.

(56) References Cited

U.S. PATENT DOCUMENTS

| | | | | |
|---|---|---|---|---|
| 2009/0177345 | A1* | 7/2009 | Severinsky et al. | 701/22 |
| 2011/0004363 | A1* | 1/2011 | Severinsky et al. | 701/22 |
| 2011/0184602 | A1* | 7/2011 | Severinsky et al. | 701/22 |
| 2011/0190971 | A1* | 8/2011 | Severinsky et al. | 701/22 |
| 2011/0301790 | A1* | 12/2011 | Atluri et al. | 701/22 |

* cited by examiner

*Primary Examiner* — Ian Jen
(74) *Attorney, Agent, or Firm* — John A. Miller; Miller IP Group, PLC

(57) ABSTRACT

A method for predicting the remaining travel distance of an electric vehicle. The method includes determining a useable battery energy value based on battery state-of-charge and battery capacity and a power value needed to heat or cool a vehicle cabin. The method determines an available battery energy value based on the useable battery energy value and an estimated energy value to provide the vehicle cabin heating or cooling, where the estimated energy value is determined using the power value. The method determines a recent energy used value based on an actual recent HVAC energy used value, a recent energy used value with no HVAC system loads and a recent energy used value with maximum HVAC system loads. The method determines a recent distance traveled value and determines the range by dividing the recent distance traveled value by the recent energy used value and multiplying by the available battery energy value.

20 Claims, 1 Drawing Sheet

ELECTRICAL VEHICLE RANGE PREDICTION

CROSS-REFERENCE TO RELATED APPLICATIONS

This application claims the benefit of the priority date of U.S. Provisional Patent Application Ser. No. 61/408,468, titled Electrical Vehicle Range Prediction, filed Oct. 29, 2010.

BACKGROUND OF THE INVENTION

1. Field of the Invention

This invention relates generally to a system and method for predicting the driving range of an electrical vehicle and, more particularly, to a system and method for predicting the driving range of a plug-in battery only electric vehicle that considers the power draw from the vehicle's heating, ventilation and cooling (HVAC) system.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery system for an electric vehicle may include a large number of battery cells or modules to meet the vehicle power and energy requirements. The battery system can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

For plug-in electric vehicles (EV) capable of driving on battery power for extended distances, the remaining vehicle travel distance that is able to be provided by the battery is crucial information to be displayed to the driver and necessary for vehicles that run on battery power only. Currently, systems and algorithms do exist for determining this distance traveled value. However, those known systems are somewhat limited in that they do not consider power draw by the vehicles heating, ventilation and cooling (HVAC) system or are able to learn a driver's driving habits over time to calculate the distance.

SUMMARY OF THE INVENTION

In accordance with the teachings of the present invention, a system and method are disclosed for predicting the remaining travel distance of an electric vehicle that is running on battery power. The method includes determining a useable battery energy value based on battery state-of-charge and battery capacity and determining a power value needed to heat or cool a vehicle cabin. The method then determines an available battery energy value based on the useable battery energy value and an estimated energy value to provide the vehicle cabin heating or cooling, where the estimated energy value is determined using the power value. The method then determines a recent energy used value based on an actual recent HVAC energy used value, a recent energy used value with no HVAC system loads and a recent energy used value with maximum HVAC system loads. The method determines a recent distance traveled value and determines the range by dividing the recent distance traveled value by the recent energy used value and multiplying by the available battery energy value. The recent distance traveled value, the actual recent HVAC energy used value, the recent energy used value with no HVAC system load and the recent energy used value with maximum HVAC system load are stored in both a short-term accumulator and a long-term accumulator for providing both quick range predictions and driver profile learning over time.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for predicting the remaining distance that an electric vehicle can travel that is running on battery power is merely exemplary in nature, and is in no way intended to limit the invention or its applications or uses.

Figure 1:
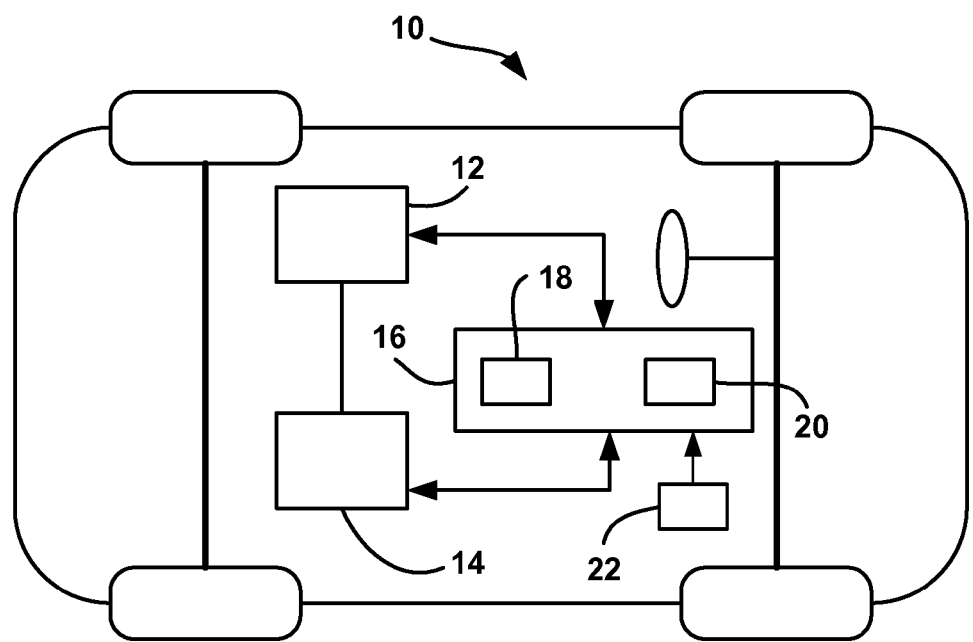
FIG. 1 is a schematic illustration of an electric vehicle.

FIG. 1 is a simplified schematic illustration of a vehicle 10 including a high voltage battery 12 and a main power source 14, where the vehicle 10 is intended to represent any hybrid vehicle, such as hybrid internal combustion engine vehicles, fuel cell system vehicle, etc. The battery 12 can be any battery suitable for a hybrid vehicle, such as a lead-acid battery, metal hydride battery, lithium-ion battery, etc. The vehicle 10 is also intended to represent any electric only vehicle that only employs a battery as the power source. The vehicle 10 includes a controller 16 that is intended to represent all of the control modules and devices necessary for the proper operation and control of the battery 12 and the power source 14 to drive the vehicle 10, and calculate the estimated remaining distance that the vehicle 10 can travel on the available battery power, as will be discussed in detail below. The controller 16 includes a short-term accumulator (STA) 18 and a long-term accumulator (LTA) 20 used for this purpose, and also described in detail below. The vehicle 10 also includes an HVAC system 22.

As will be discussed in detail below, the present invention proposes a system and method that operates an algorithm that provides the driver of an electric vehicle with the estimated distance remaining that the vehicle is capable of traveling on battery power. The algorithm records the ratio of distance traveled over energy used. That ratio is multiplied by the remaining usable energy left in the battery pack. The remaining energy is found by multiplying the capacity of the high voltage battery by the remaining high voltage battery state-of-charge (SOC) percentage. The result of multiplying the ratio by the remaining energy is the remaining distance that can be traveled, where the ratio is a profile for the driver. If the driver is an aggressive driver, the ratio will be a smaller value than someone who drives in a manner that conserves energy, resulting in a lower electric vehicle (EV) range prediction.

Two accumulators are used for distance and energy, including the STA 18 that adapts quickly to new driver inputs, such as increasing the vehicle speed or traveling uphill. The values are calibrated such that the algorithm can adapt quickly, but not give an erratic response to the driver. The LTA 20 keeps a longer history of driver information so that a more predictable EV range estimation can be given over the course of several weeks of driving. The two accumulators 18 and 20 work together to provide an accurate range prediction for a new driver or a new driving route, but maintain the history for the regular driver and/or regular route.

The algorithm is a learning algorithm so that the more driving that occurs, the more accurate the prediction becomes. While driving, the range prediction is based on the STA 18. When the vehicle 10 is plugged in for charging, the data in the LTA 20 is copied and rescaled into the STA 18. This is done to ensure that the most accurate driving profile is used for the range prediction the next time the vehicle 10 is started.

Due to the somewhat erratic nature of a high voltage battery SOC, added protection for increasing the range prediction is provided. Calibrations are provided to control how much the range value needs to change before the output is updated for the driver. For example, when the range is decreasing, the range estimation value provided to the driver is allowed to decrease slightly faster than the actual range prediction. This is especially useful at low range values when the vehicle's high voltage battery is more susceptible to running out of energy. If the range prediction is increasing, the range estimation value is increased by some value greater than 1. This is done to show the driver that gaining range while driving is difficult to achieve, but also to avoid errors associated with a temporary increase in the battery SOC due to small amount regenerative braking.

The algorithm also provides compensation for using the HVAC system 22. The HVAC system 22 operates off of the high voltage battery 12 where the driver will use more battery energy to heat and cool the vehicle cabin. The algorithm monitors this additional power use and adjusts the driving profile of the STA 18 to compensate for it. For example, when the HVAC system 22 is turned on an additional 3 kW of power will be used, and the energy used in the STA 18 is increased. This will decrease the ratio and therefore decrease the estimated range remaining. When turning off the HVAC system 22, the energy used will change again, but this time it is done to increase the ratio and therefore increase the range prediction. The percent that the energy use has changed is handled through calibration, which is set after data collection. The reason for adjusting the range due to HVAC system use, as opposed to letting the energy work itself out naturally, is to condition the STA 18.

Figure 2:
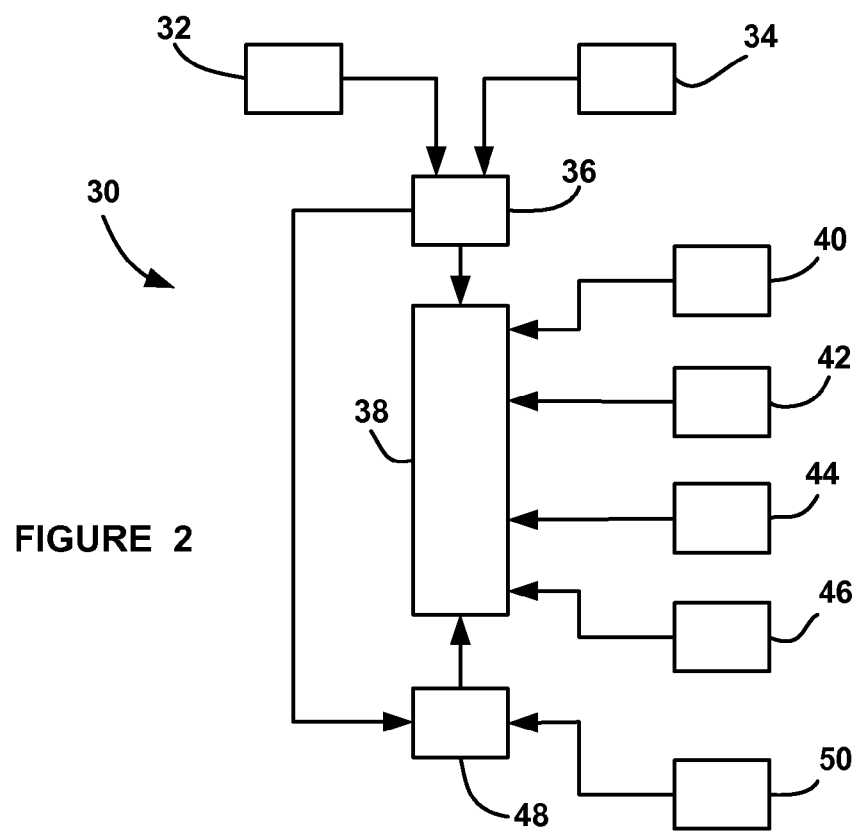
FIG. 2 is a flow chart diagram for an algorithm that predicts vehicle travel distance of a vehicle running on battery power.

FIG. 2 is a flow chart diagram 30 showing an operation of the algorithm outlined above to determine an estimated distance value that the vehicle 10 can travel on the current battery SOC. At box 32, the algorithm calculates the useable battery energy, which is defined as the battery SOC percent multiplied by the battery capacity divided by 100%. Battery control algorithms require that the battery SOC be within a certain percentage of the total battery capacity, for example, 22%-85%, so that the battery 12 does not get over charged or under charged, which could otherwise limit its useable life. The battery capacity is the amount of total energy that the battery 12 can store at any particular point in its life. To calculate the useable battery energy, the algorithm first reads the battery SOC, subtracts the minimum value that the battery SOC can fall to, and defines the useable SOC range as an SOC percentage. The algorithm then multiplies the SOC percentage by the capacity of the battery 12, and divides by 100% to get the useable battery energy. This gives how much energy is in the battery 12 at any particular point of time.

At box 34, the algorithm determines the load provided by the HVAC system 22, which is used to modify the useable battery energy and provide corrections in the STA 18 and the LTA 20, discussed in more detail below. In order to determine the HVAC system loads, the algorithm reads in the amount of power being used to heat or cool the vehicle cabin, and calculates the total power draw on the vehicle's electrical system. These values are provided by the HVAC system module, and include the HVAC heater power, the HVAC system compressor power and a percentage value that identifies how much of the compressor power is being used to cool the vehicle cabin and how much of the compressor power is being used to cool the battery 12. The algorithm also determines how much power is necessary to reach the temperature request by the driver and how much power is needed to maintain the cabin at that temperature, both of which are provided by the HVAC system module. These values are calibrateable. The algorithm then determines whether these values will affect the distance value by how large they are.

The algorithm uses the useable battery energy from the box 32 and the information from the HVAC module from the box 34 to calculate the available battery energy at box 36, which is the useable battery energy minus the predicted battery energy, that will be required to meet the HVAC system loads. The HVAC system loads may be limited based on the amount of useable battery energy to avoid dropping the battery SOC below the required minimum value.

The algorithm uses the available battery energy from the box 36 to calculate the estimated driving range at box 38. The STA 18 stores four values for this calculation, namely, a recent distance traveled value from box 40, a recent battery energy used value from box 42, a recent battery energy used value with no HVAC system loads from box 44, and the recent battery energy used with maximum HVAC system loads from box 46. The algorithm calibrates the values stored in the STA 18 to rescale the values in a relatively fast manner based on maximum system limits. As these values accumulate in the STA 18, each accumulated value is compared to a predetermined maximum value, and when one of the values exceeds its maximum value, the algorithm rescales all of the values so that all of the values are reduced some amount so that the value that exceeded its maximum does not anymore. This rescaling provides a representation of the most recent driving habits of the driver. By performing this rescaling, the ratio between the values remains substantially the same.

The calibration that provides each maximum value, the rescale value and the initial accumulator value are selected to provide a fast response to new driving conditions, such as going from city driving to highway driving, and vice versa. The following discussion provides a detailed showing of how this calibration strategy operates in this manner.

Based on the rescaling process, the vehicle range is determined by the distance the vehicle 10 has traveled divided by the recent battery energy used value multiplied by the available battery energy value. Thus, if the distance traveled is in kilometers and the battery energy is in watt hours, the resulting value will be in kilometers. The ratio of the distance traveled value divided by the available battery energy value is limited to prevent erratic behavior caused by drastic energy use or regenerative braking, such as traveling on steep grades.

The recent distance traveled value is determined at the box 40 by using the sum of an odometer delta value, where the odometer delta value is equal to the current odometer reading value minus a previous odometer reading value, calculated every predetermined time step. Thus, the odometer delta value gives a distance traveled per time step.

To determine the recent energy value without HVAC system loads at the box 42, the algorithm determines a useable energy delta value for the usable energy. As above, the battery SOC times the battery capacity gives the available energy in the battery 12. Thus, for every time step there will be a change in the useable energy of the battery 12. As the vehicle 10 uses battery energy and the useable energy of the battery 12 decreases, the useable energy delta value is positive as accumulated in the STA 18. If regenerative braking has occurred where energy is put into the battery 12, the useable energy delta value is negative, which reduces the accumulation in the STA 18. The useable energy delta calculation is used for all three of the energy used values stored in the STA 18. The recent energy used without HVAC system loads is determined by using the amount of HVAC energy over a predetermined number of time steps and subtracting that value from the summation of the useable energy delta values for those time steps to give the energy used from driving only.

To determine the recent energy used value for maximum HVAC system loads at the box 44, the algorithm adds all of the useable energy delta values which would include the energy currently being used to satisfy the HVAC system loads, and adds that value to what the possible energy could be for maximum HVAC system loads. The HVAC system module will be able to provide the maximum possible HVAC system loads, which can be subtracted from the current HVAC system loads being used to get the remaining possible HVAC system loads.

To determine the actual recent energy used value at the box 46, the algorithm adds all of the useable energy delta values discussed above, and adds that value to an interpolated estimated HVAC energy delta value. The interpolated energy delta value is determined by creating two data points, one for the recent energy used value without HVAC system loads and one for the recent energy used with maximum HVAC system loads. The algorithm uses the current power necessary to maintain the vehicle cabin at the desired temperature and performs a linear interpolation between the two data points to get an estimate of the total received energy used. When the driver turns on the HVAC system 22, the recent energy used is set to an interpolated value, which causes the recent energy used to go up, and therefore the range estimation to go down. When the HVAC system 22 is turned off, the recent energy used value is set to the recent energy used with no HVAC system loads, which causes the recent energy used value to go down and therefore the range estimation to go up. As the vehicle 10 is operating, any of the energy delta values in the interpolated estimated HVAC system energy are added to the useable energy delta value to provide a continuous compensation for changes in the HVAC system loads. Thus, the distance traveled divided by the recent energy used value gives the recent driving profile, which is then multiplied by the available energy value to get the estimated range value.

The algorithm uses the LTA 20 to provide a long term history of the driver's profile so that it can more accurately determine the driving range based on knowledge in an adaptive learning environment at box 48. The LTA 20 operates in the same manner as the STA 18 where it stores the values of distance traveled, energy used, recent energy used with no HVAC system loads and recent energy used with maximum HVAC system loads. The LTA 20 is also calibrated, as discussed above, so that these values are rescaled based on the maximum thresholds where once the distance traveled or energy used becomes greater than the specified amount, all of the values in the LTA 20 are rescaled to represent the normal driving habits. This calibration strategy allows for a stable range prediction based on common routes.

The same calculations are performed in the LTA 20 as were performed in the STA 18, except that the LTA 20 receives a calculated historical energy used value from box 50. Instead of interpolating to calculate the historical energy used, the algorithm sums the useable energy deltas. This allows for the most accurate range prediction based on the driver's driving habits. If the driver is a normal user of the HVAC system 22, this is learned by the algorithm and put into the range prediction over time so that turning the HVAC system 22 on and off will not cause the range value to significantly change.

The LTA 20 is used to learn the driving habits of a particular driver. The range value that is displayed is based on the data in the STA 18. However, every time the vehicle 10 is plugged into to be charged, the data from the LTA 20 is transferred and stored in the STA 18 and rescaled for the STA limits. By doing this, the algorithm learns the normal driving habits because more data is contained in the LTA 20.

The algorithm also provides protection against display flicker which could otherwise occur if the range value displayed changes back and forth between to values. This could occur if the energy used changes as a result of regenerative braking. The protection against display flicker includes filtering to smooth out the range signal. In addition to the filters, the algorithm employs logic that allows the range value to increment only after the raw range value has increased by more than a certain amount. For example, the range displayed to the driver will not increase by 1 mile unless the raw value has increased by 1.5 miles. This ensures that the small amounts of regenerative braking will not cause the range value to change, which can create doubt in the value.

The calibration values discussed above for maximum value, rescale value, initial STA value, etc. for the operational behavior of the algorithm are incorporated within the algorithm. The calibration values are provided for the STA 18 and the LTA 20 to allow for slower or faster learning rates. The size of the STA 18 and the LTA 20 and the rescale factors for distance and energy used determines the learning rate. The rescale factor for the STA 18 and the LTA 20 determines a confidence factor for the data in the STA 18 or the LTA 20, where the higher the confidence factor the closer the rescale factor is to 1 and the lower the confidence factor the closer the rescale factor is to zero. Further, considering the number of rescale factors that are desired works in conjunction with the confidence factor to determine the rescale factor.

The calibration values within the algorithm are calculated values from a series of inputs that relate to generally expected driving usages, component characteristics, desired initial display values, etc. Table 1 below provides non-limiting, exemplary inputs to determine calibration values for the algorithm used by the STA 18 and the LTA 20.

TABLE 1

| INPUTS | VALUES |
|---|---|
| SOC Max | 85.70% |
| SOC Min | 22.00% |
| Battery Cap | 16100 Wh |
| Max EV Range (after flash range) | 25 Miles |
| Default Range | 25 Miles |
| Average EV Miles per Year | 9000 Miles |
| Time to learn a new driver | 3 Days |
| Time to Reseason | 5 Days |
| SW Loop Rate | 0.1 s |
| Learn Distance | 8 Miles |
| Number of Rescales | 250 |
| Confidence Factor | 92.00% |

TABLE 1-continued

| INPUTS | VALUES |
|---|---|
| Number of Rescales | 75 |
| Confidence Factor | 92.00% |

The ability to show vehicle range jumps due to the usage of the HVAC system 22 is also incorporated into the algorithm. The calibrations values allow for the vehicle range to be adjusted down or up when an HVAC input of sufficient impact is provided. An example would be the use of air conditioning on a hot day when the driver causes the HVAC system 22 to operate using some calibratable amount of energy in the HVAC system 22, where a range drop of the representative distance will result. Likewise, if the HVAC system 22 is shut off after running for some time, a range increase will result. This function can also be calibrated so that the range jumps do not happen.

The algorithm also monitors faults that may occur based on invalid odometer or battery data, or the STA 18 and the LTA 20 do not accumulate new data. Table 2 below gives the results for the range prediction in response to whether the odometer reading or the state-of-charge and battery capacity reading are valid.

TABLE 2

| Odometer | SOC/Capacity | Result |
|---|---|---|
| VALID | VALID | Range calculated as normal |
| INVALID | VALID | Range found based on decreasing SOC |
| VALID | INVALID (for <60 s) | Range found based on increasing odometer reading |
| VALID | INVALID (for >60 s) | Range set to 0 |
| INVALID | INVALID | Range set to 0 after 60 s |

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining an available range for a vehicle operating on battery power from a battery, said method comprising:
performing in a processor the steps of:
determining a useable battery energy value based on battery state-of-charge and battery capacity;
determining a power value needed to heat or cool a vehicle cabin by a vehicle heating, ventilation and cooling (HVAC) system;
determining an available battery energy value based on the useable battery energy value and an estimated energy value to provide the vehicle cabin heating or cooling where the estimated energy value is determined using the power value;
determining a recent energy used value based on an actual recent HVAC energy used value, a recent energy used value with no HVAC system loads and a recent energy used value with maximum HVAC system loads;
determining a recent distance traveled value; and
determining the range by dividing the recent distance traveled value by the recent energy used value and multiplying by the available battery energy value.

2. The method according to claim 1 further comprising storing the recent distance traveled value, the actual recent energy used value, the recent energy used value with no HVAC systems load and the recent energy used with maximum HVAC systems load in a short-term accumulator.

3. The method according to claim 2 further comprising rescaling the values stored in the short-term accumulator if any of the values exceeds a predetermined maximum value.

4. The method according to claim 2 further comprising storing the recent distance traveled value, the recent energy used value, the recent energy used with no HVAC system loads and the recent energy used with maximum HVAC system loads in a long-term accumulator.

5. The method according to claim 4 further comprising transferring the values from the long-term accumulator to the short-term accumulator when the battery is being charged.

6. The method according to claim 5 further comprising rescaling the long-term accumulator values to calibrated values in the short-term accumulator.

7. The method according to claim 1 wherein determining the recent energy used value includes interpolating the recent energy used value between a recent energy used with no HVAC load data point and a recent energy used with a maximum HVAC load data point.

8. The method according to claim 1 wherein determining a recent distance traveled value includes subtracting a current odometer value minus a previous odometer value over a predetermined time step.

9. The method according to claim 1 further comprising calculating range jumps of the available range for the vehicle in response to usage of the HVAC system.

10. A method for determining an available range for a vehicle operating on battery power from a battery, said method comprising:
performing in a processor the steps of:
determining a useable battery energy value based on battery state-of-charge and battery capacity;
determining a power value needed to heat or cool a vehicle cabin a vehicle heating, ventilation and cooling (HVAC) system;
determining an available battery energy value based on the useable battery energy value and an estimated energy value to provide the vehicle cabin heating or cooling where the estimated energy value is determined using the power value;
determining a recent energy used value based on an actual recent HVAC energy used value, a recent energy used value with no HVAC system loads and a recent energy used value with maximum HVAC system loads;
determining a recent distance traveled value;
determining the range by dividing the recent distance traveled value by the recent energy used value and multiplying by the available battery energy value;

storing the recent distance traveled value, the actual recent energy used value, the recent energy used value with no HVAC systems load and the recent energy used with maximum HVAC systems load in a short-term accumulator;

storing the recent distance traveled value, the recent energy used value, the recent energy used with no HVAC system loads and the recent energy used with maximum HVAC system loads in a long-term accumulator;

determining the range by dividing the recent distance traveled value by the recent energy used value and multiplying by the available battery energy value; and calculating range jumps of the available range for the vehicle in response to usage of the HVAC system.

11. The method according to claim 10 further comprising rescaling the values stored in the short-term accumulator if any of the values exceeds a predetermined maximum value.

12. The method according to claim 10 further comprising transferring the values from the long-term accumulator to the short-term accumulator when the battery is being charged.

13. The method according to claim 10 further comprising rescaling the long-term accumulator values to calibrated values in the short-term accumulator.

14. The method according to claim 10 wherein determining the recent energy used value includes interpolating the recent energy used value between a recent energy used with no HVAC load data point and a recent energy used with maximum HVAC load data point.

15. The method according to claim 10 wherein determining a recent distance traveled value includes subtracting a current odometer value minus a previous odometer value over a predetermined time step.

16. A system for determining an available range for a vehicle operating on battery power from a batter, said system comprising:

means for determining a useable battery energy value based on battery state-of-charge and battery capacity;

means for determining a power value needed to heat or cool a vehicle cabin a vehicle heating, ventilation and cooling (HVAC) system;

means for determining an available battery energy value based on the useable battery energy value and an estimated energy value to provide the vehicle cabin heating or cooling where the estimated energy value is determined using the power value;

means for determining a recent energy used value based on an actual recent HVAC energy used value, a recent energy used value with no HVAC system loads and a recent energy used value with maximum HVAC system loads;

means for determining a recent distance traveled value; and means for determining the range by dividing the recent distance traveled value by the recent energy used value and multiplying by the available battery energy value.

17. The system according to claim 16 further comprising means for storing the recent distance traveled value, the actual recent energy used value, the recent energy used value with no HVAC systems load and the recent energy used with maximum HVAC systems load in a short-term accumulator.

18. The system according to claim 17 further comprising means for storing the recent distance traveled value, the recent energy used value, the recent energy used with no HVAC system loads and the recent energy used with maximum HVAC system loads in a long-term accumulator.

19. The system according to claim 18 further comprising means for transferring the values from the long-term accumulator to the short-term accumulator when the battery is being charged.

20. The system according to claim 19 further comprising means for resealing the long-term accumulator values to calibrated values in the short-term accumulator.

* * * * *